(12) United States Patent
Williams et al.

(10) Patent No.: US 8,913,612 B2
(45) Date of Patent: *Dec. 16, 2014

(54) REDUNDANT MEDIA PACKET STREAMS

(71) Applicant: Audinate Pty Limited, Ultimo, New South Wales (AU)

(72) Inventors: Aidan Williams, Chifley (AU); Andrew White, Eveleigh (AU)

(73) Assignee: Audinate Pty Limited, Ultimo, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,308

(22) Filed: Mar. 4, 2013

(65) Prior Publication Data

US 2013/0191549 A1    Jul. 25, 2013

Related U.S. Application Data

(63) Continuation of application No. 13/152,815, filed on Jun. 3, 2011, now Pat. No. 8,411,679, which is a continuation of application No. 12/308,168, filed as application No. PCT/AU2007/000667 on May 17, 2007, now Pat. No. 7,978,696.

(30) Foreign Application Priority Data

May 17, 2006   (AU) .................................. 2006902741
Oct. 19, 2006   (AU) .................................. 2006906015

(51) Int. Cl.
*H04L 12/56* (2006.01)
*H04L 12/879* (2013.01)
(Continued)

(52) U.S. Cl.
CPC .............. *H04L 65/60* (2013.01); *H04L 49/901* (2013.01); *H04L 47/564* (2013.01); *H04L 49/90* (2013.01); *H04L 65/4092* (2013.01); *H04N 21/4392* (2013.01); *H04L 12/5693* (2013.01)
USPC ....................................................... 370/389

(58) Field of Classification Search
USPC .......................... 370/216–228, 252, 254, 389, 370/395.5–395.52, 412–413, 428, 463–465
See application file for complete search history.

(56) References Cited

U.S. PATENT DOCUMENTS 5,682,384 A    10/1997   Zarros
6,175,604 B1    1/2001   Noro et al.
(Continued)

FOREIGN PATENT DOCUMENTS

EP    1148687    10/2001
EP    1398931    3/2004
(Continued)

OTHER PUBLICATIONS

International Search Report dated Jul. 17, 2007 for PCT/AU2007/000667.

(Continued)

*Primary Examiner* — Frank Duong
(74) *Attorney, Agent, or Firm* — Jones Day (57) ABSTRACT

This invention concerns the transmitting and receiving of digital media packets, such as audio and video channels and lighting instructions. In particular, the invention concerns the transmitting and receiving of redundant media packet streams. Samples are extracted from a first and second media packet stream. The extracted samples are written to a buffer based on the output time of each sample. Extracted samples having the same output time are written to the same location in the buffer. Both media packet streams are simply processed all the way to the buffer without any particular knowledge that one of the packet streams is actually redundant. This simplifies the management of the redundant packet streams, such as eliminating the need for a "fail-over" switch and the concept of an "active stream", The location is the storage space allocated to store one sample. The extracted sample written to the location may be written over another extracted sample from a different packet stream previously written to the location. These extracted samples written to the same location may be identical.

22 Claims, 6 Drawing Sheets

(51) Int. Cl.
    *H04L 12/875*     (2013.01)
    *H04L 29/06*     (2006.01)
    *H04L 12/861*     (2013.01)
    *H04N 21/439*     (2011.01)
    *H04L 12/54*     (2013.01)

(56) References Cited

U.S. PATENT DOCUMENTS

| | | |
|---|---|---|
| 6,360,271 B1 | 3/2002 | Schuster et al. |
| 6,553,040 B2 | 4/2003 | Bernath et al. |
| 6,611,537 B1 | 8/2003 | Edens et al. |
| 6,661,804 B2 | 12/2003 | Fellman et al. |
| 6,665,308 B1 | 12/2003 | Rakib et al. |
| 6,675,314 B1 | 1/2004 | Yamada et al. |
| 6,763,479 B1 | 7/2004 | Herbert |
| 6,857,080 B1 | 2/2005 | Liang |
| 7,000,031 B2 | 2/2006 | Fischer et al. |
| 7,096,271 B1 | 8/2006 | Omoigul et al. |
| 7,206,367 B1 | 4/2007 | Moore |
| 7,342,890 B1 | 3/2008 | Ferguson |
| 7,551,647 B2 | 6/2009 | Fellman et al. |
| 7,747,725 B2 | 6/2010 | Williams et al. |
| 2001/0038674 A1 | 11/2001 | Trans |
| 2002/0136198 A1 | 9/2002 | Findikli |
| 2002/0150053 A1 | 10/2002 | Gray et al. |
| 2003/0093703 A1 | 5/2003 | Oliver et al. |
| 2003/0156603 A1 | 8/2003 | Rakib et al. |
| 2003/0223409 A1 | 12/2003 | Wiebe |
| 2003/0235216 A1 | 12/2003 | Gustin |
| 2003/0236904 A1 | 12/2003 | Walpole et al. |
| 2004/0001435 A1 | 1/2004 | Wong |
| 2004/0052209 A1 | 3/2004 | Ortiz |
| 2004/0062278 A1 | 4/2004 | Hadzic et al. |
| 2004/0100942 A1 | 5/2004 | Blank et al. |
| 2004/0228367 A1 | 11/2004 | Mosig |
| 2004/0234000 A1 | 11/2004 | Page |
| 2004/0252400 A1 | 12/2004 | Blank et al. |
| 2005/0036512 A1 | 2/2005 | Loukianov |
| 2005/0039065 A1 | 2/2005 | Cheung et al. |
| 2005/0138459 A1 | 6/2005 | Yoon et al. |
| 2005/0166135 A1 | 7/2005 | Burke et al. |
| 2005/0201399 A1 | 9/2005 | Woodward et al. |
| 2005/0288805 A1 | 12/2005 | Moore et al. |
| 2006/0005099 A1 | 1/2006 | Strasman et al. |
| 2006/0013262 A1 | 1/2006 | Downey et al. |
| 2006/0013263 A1 | 1/2006 | Fellman |
| 2006/0056432 A1 | 3/2006 | Azarov |
| 2006/0072578 A1 | 4/2006 | Alfano |
| 2006/0135258 A1 | 6/2006 | Maheshwari et al. |
| 2006/0161835 A1 | 7/2006 | Panabaker et al. |
| 2006/0280182 A1 | 12/2006 | Williams et al. |
| 2007/0002886 A1 | 1/2007 | Lanigan et al. |
| 2007/0076727 A1 | 4/2007 | Shei |
| 2007/0081562 A1 | 4/2007 | Ma |
| 2007/0280125 A1 | 12/2007 | Sonnier |
| 2008/0187282 A1 | 8/2008 | Brady et al. |
| 2010/0046383 A1 | 2/2010 | Williams et al. |
| 2010/0228881 A1 | 9/2010 | Williams et al. |
| 2010/0235486 A1 | 9/2010 | Williams et al. |
| 2011/0002429 A1 | 1/2011 | Williams et al. |

FOREIGN PATENT DOCUMENTS

| | | |
|---|---|---|
| WO | WO 00/72509 | 11/2000 |
| WO | WO 2004/008738 | 1/2004 |
| WO | WO 2005/006621 | 1/2005 |
| WO | WO 2006/057992 | 6/2006 |
| WO | WO 2007/131297 | 11/2007 |

OTHER PUBLICATIONS

Felix F. Feng; "On the worse case, and pacing"; IEEE 802.3 Residential Ethernet Study Group presentation; Sep. 30, 2005; slides 1-17.

Geoffrey M. Garner; "Delay and Delay Variation Simulation Results for Additional Multi-hop Conventional Ethernet Cases with Bursting/Bunching"; IEEE 802.3 Residential Ethernet Study Group presentation; Sep. 14, 2005; slides 1-24.

Geoffrey M. Garner; "Delay and Delay Variation Simulation Results for Multi-hop Conventional Ethernet Cases with Bursting/Bunching"; IEEE 802.3 Residential Ethernet Study Group; Aug. 19, 2005; slides 1-33.

John Nels Fuller; "Calculating the Delay Added by Qav Stream Queue"; IEEE 802.1 Qav presentation; Aug. 12, 2009; pp. 1-4.

David V. James; "Transmit State Machines"; IEEE 802.3 Residential Ethernet Study Group presentation; Sep. 21, 2005; pp. 107-121.

Yamaha Systems Solutions white paper, Networked audio system design with Cobra Net, 16 pages, 2006.

Blank et al.; "An Internet Protocol (IP) Sound System"; AES (Audio Engineering Society) 117th Convention San Francisco, CA (Oct. 2004).

Max Azarov; "Worst-case Ethernet Network Latency"; IEEE 802.3 Residential Ethernet Study Group presentation; Sep. 26, 2005; pp. 1-4.

Max Azarov; "Worst-case Ethernet Network Latency for Shaped Sources"; IEEE 802.3 Residential Ethernet Study Group presentation; Oct. 7, 2005; pp. 1-12.

Max Azarov; "On Worst-case latency for Ethernet networks and alternative shaping Concept"; IEEE 802.3 Residential Ethernet Study Group Forum available at http://grouper.ieee.org/groups/802/3/re_study/email/msg00680.html; Sep. 26, 2005.

REDUNDANT MEDIA PACKET STREAMS

CROSS REFERENCE TO RELATED APPLICATION

This application is a continuation of U.S. patent application Ser. No. 13/152,815, filed Jun. 3, 2011, which is a continuation of U.S. patent application Ser. No. 12/308,168, filed May 28, 2009, now U.S. Pat. No. 7,978,696, which is the National Phase of International Application No. PCT/AU2007/000667, filed 17 May 2007, which further claims the benefit of Australian Provisional Application Nos. 2006902741, filed 17 May 2006 and 2006906015, filed 19 Oct. 2006. Each of these applications, in their entirety, are incorporated herein by reference.

TECHNICAL FIELD

This invention concerns the transmitting and receiving of digital media packets, such as audio and video channels and lighting instructions. These media channels are transmitted as media packets from a transmitter device to a receiver device for playout. In particular, the invention concerns the transmitting and receiving of redundant media packet streams. The invention concerns a transmitter device, a receiver device, a data network, method of receiving a media packet stream and computer software to perform this method.

BACKGROUND ART

Media channels, such as audio and video channels, have long been transmitted using application specific cables. For instance, two-core speaker cable is used to carry left and right audio channels from amplifiers to speakers.

More recently, media signals have been transmitted on computer based networks using protocols such as unicast or multicast. Unicast is a method of sending packets on a computer network to a single destination. The unicast packets must be retransmitted for every media device that wishes to receive the packets.

Multicast is typically used to refer to IP multicast, which is a protocol for efficiently sending to multiple receiver devices at the same time on TCP/IP networks by use of a multicast address. The computer network then operates to route the packets to each of the devices on the network that wish to receive the multicast packets.

Media networks can allow for redundant media packet streams to be transmitted and received. It is known for the transmitter to continually process the primary media packet stream and simply ignore the redundant copy of the media packet stream. In the event that a problem is detected in the primary packet stream (i.e. a broken transmission path in the network) a "fail-over" switch is enacted. Once the switch is activated, the receiver device then ignores the primary media packet stream and processes the redundant copy.

SUMMARY OF THE INVENTION

In one aspect the invention provides a receiver device for receiving media packet streams from a data network, the receiver device comprising:
 a first data interface to receive a first media packet stream containing samples of a media channel;
 a second data interface to receive a second media packet stream containing the samples of the media channel;
 a processor to extract samples from the first and second media packet streams and to determine an output time for the extracted samples;
 a buffer to temporarily store the extracted samples for output; and
 wherein the processor operates to cause the extracted samples to be written to the buffer based on the respective output time, such that extracted samples having the same output time are written to the same location in the buffer.

In this way the receiver device simply processes both media packet streams all the way to the buffer without any particular knowledge that one of the packet streams is actually redundant. This simplifies the management of the redundant packet streams, such as eliminating the need for a "fail-over" switch. Further, the concept of an "active stream" is no longer required.

The buffer may be designed to store a predetermined maximum number of extracted samples in sequential order according to the output time of each extracted sample. The location is the storage space allocated to store one sample. A first extracted sample written to the location may be written over a second extracted sample from a different packet stream previously written to the location. The first and second extracted samples written to the same location may be identical.

The buffer may be associated to one output channel and each media packet stream may be directed to the same output channel. Each media packet stream may contain two or more media channels. The receiver device may further comprise a third data interface to receive a third media packet stream containing the samples of the media channel, wherein the processor further operates to extract samples from the third media packet stream and to determine an output time for the extracted samples. Since there are no special management controls required to process the redundant packet stream, the number of redundant packet streams can easily be increased and all processed in the same way.

The first and second media packet streams may be received from different data interfaces from the same transmitter device connected to the data network.

The processor may further operate to detect samples that are corrupted and to prevent these corrupted samples from being written to the buffer. All the samples contained in one media packet of the first media packet stream may not be contained in any single media packet of the second media packet stream.

Even if the samples of the two media streams are not packetized in the same way the processor operates to extract and write the samples in the same way regardless.

Samples of the media channel may have an associated timestamp and the processor may operate to determine the output time of the extracted samples based on the respective timestamps. The timestamp may be an absolute time stamp and may represent the sampling time.

The invention may further comprise a method of receiving media packet streams from a data network, the method comprising the steps of:
 receiving a first media packet stream containing samples of a media channel;
 receiving a second media packet stream containing the samples of the media channel;
 extracting samples from the first and second media packet streams; determining an output time for the extracted samples;

based on the respective output time, writing the extracted samples to a buffer for output, such that extracted samples having the same output time are written to the same location in the buffer.

In a further aspect the invention provides computer software to operate a receiver device to perform the method described above.

In yet a further aspect the invention provides a transmitter device for transmitting media packet streams on a data network to a receiver device, the transmitter device comprising:
one or more data interfaces to transmit a first media packet stream and a second media packet stream to the receiver device, the media streams containing one or more media channels;
based on a request from the receiver device, a processor to packetize media channels to create media packet streams for transmission from the data interfaces; and
a controller to cause the processor to create two independent media packet streams containing the same media channels to be transmitted to the receiver device.

The request may be to address a first media packet stream containing media channels to a first interface of the receiver device and a second media packet stream containing the same media channels to a second interface of the receiver device. The request may be a single message received from the receiver device.

The transmitter device may comprise a first data interface to transmit the first media packet stream and a second data interface to transmit the second media packet stream.

The data network may be comprised of first and second data sub-networks. The controller may cause the first media packet stream to be transmitted on the first data sub-network and the second media packet stream to be transmitted on the second data sub-network. In this way, if one data network fails to successfully pass one or more packets then the same media channels are passed via the other sub-network and no data loss occurs. Further the first data sub-network may have a different configuration to the second data sub-network, such as different transmission protocols.

The invention also concerns a method and software for transmitting two media packet streams containing the same media channels to the receiver device.

In yet a further aspect the invention provides a computer network comprising a receiver device and a transmitter device as described above.

BRIEF DESCRIPTION OF THE DRAWINGS

Examples of the invention will now be described with reference to the accompanying drawings in which:

FIGS. 3 (*a*) to 3(*d*) is a schematic view of how redundancy can be implemented in the data network;

BEST MODE OF THE INVENTION

Overview of the Components of the Network

Figure 1:
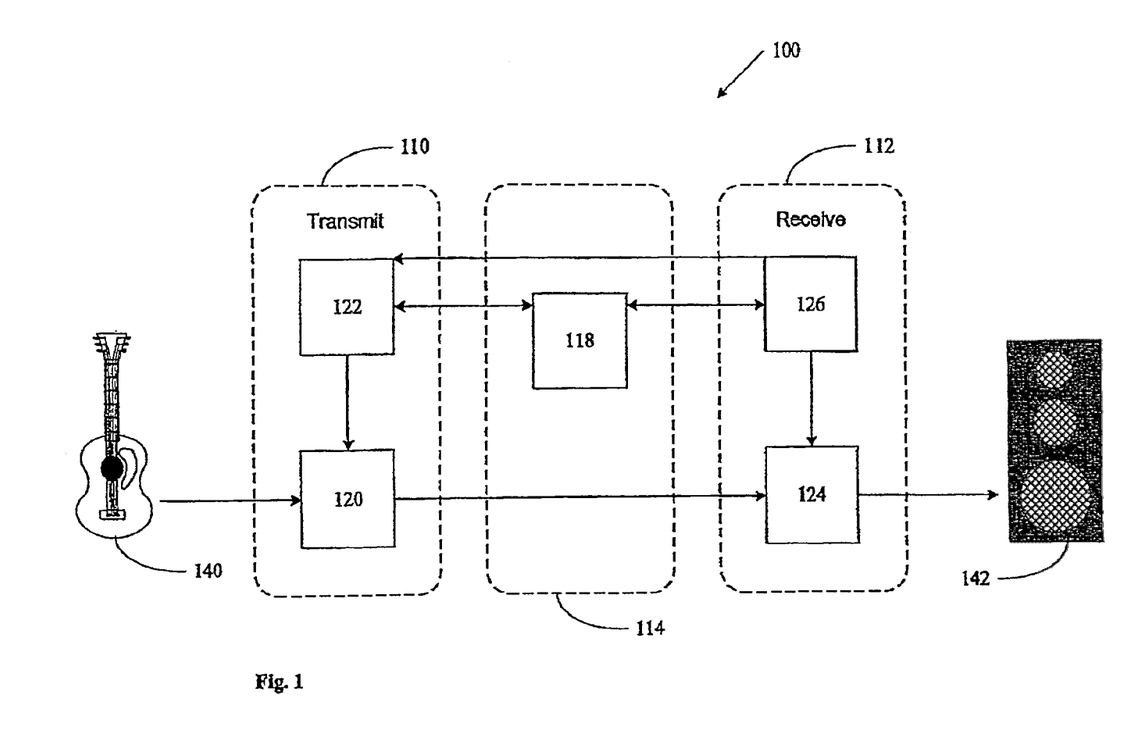
FIG. 1 is a schematic diagram of a network that can be used with the invention.

Referring first to FIG. 1, a data network is described. The data network 100 comprises a transmitter device 110 and a receiver device 112. There may be a plurality of transmitter devices 110 and receiver devices 112 on the network 100, but only one of each is discussed here for clarity. Further, the devices 110 and 112 may be able to perform both transmitting and receiving functions, but they are described here as only performing one function each again for better clarity.

The transmitter device 110 and the receiver device 112 are connected to each other by a network 114 so that they are able to send and receive digital media packets as part of a media packet stream. The transmitter device 110 is comprised of an Audio Processing Engine (APE) 120 and an Audio Processing Engine Controller (APEC) 122. The receiver device 112 is also comprised of an APE 124 and an APEC 126. The media packets are sent in media packet streams that can contain one or more media channels. For simplicity, the embodiments describe all media channels in a media packet stream to be the same format however the invention can accommodate for multiple media channel formats within the one media packet stream.

A media device 140, such as a guitar, is connected to the APE 120 and the APE 120 receives the media signals generated by the media device 140. A preprocessor (not shown) may be added to convert the media channel from analogue to digital or convert from one digital format to another (e.g. sample rate or bit depth conversion). The APE 120 then packetizes the digital media channel. The resulting packet stream is sent using the network 114 to the APE 124 of the receiver device 112. The APE 124 then de-packetizes the digital media signal, (if suitable) converts it to analogue and transmits the analogue media signal to the media device 142, such as a speaker for playout. Conversion will not be necessary when the media signals are non-analogue sources, such as a MIDI sources. The rate and offset of packetization and transmission is tightly controlled in time to ensure that the playout of the media signal by the media device 142 is synchronized with the playout of the media signals by another media device (not shown) connected to the network 114 that also received the media signal from the APE 120. The packetization operation of the APEs 120 and 124 is described in detail in the co-pending PCT application PCT/AU2006/000538 (WO 2006/110960). Reference is also made to the co-pending PCT application filed this day claiming priority from AU2006906015 and AU2006902741.

An APEC 122/126 is a component implemented in software or hardware. In this network 100, the APEC 122/126 is on the same physical device as the APE 120/124, but alternatively may be located remotely from the APE 120/124 such as on another device or a central computer connected to the network 114. An APEC 122/126 provides the user with an abstract view of the APEs 120/124 and any audio devices 140 and 142 connected to them. A transmitter device 110 has a number of transmittable channels that can be named and then made available to receiver devices 112 on the network 114; this is called advertisement. A receiver device 112 has a number of receiving channels. A named transmitting channel can be assigned to a receiving channel; this is called subscription. APECs 122 and 126 will configure the APEs 120/124 to cause the media signals to be routed from the transmitting channel to the receiving channel.

The receiving and transmitting APECs 126 and 122 exchange configuration information and control messages over the network 114. Configuration information is exchanged via a service discovery database 118, such as DNS-SD. This database may be implemented in a distributed manner with each device 110 and 112 storing and providing the configuration information associated with its APEC 122/126. Additional control messages are sometimes required to complete the subscription process and cause media signals to be routed. These are sent between the receiving APEC 126 and the transmitting APEC 122.

Each APEC 122/126 configures its own APE 120/124 and interacts with other APECs 122/126 to ensure that configurations match between communicating APEs 120/124.

Inside each device 110 and 112, input channels such as the channel from audio device 140 are known as "TX channels" because they will be transmitted over the network, and output channels such as the channel that is sent to audio device 142 are known as "RX channels" because they will receive data from the network.

Initially, the devices must be connected to create the network 104. Referring to Fig. four media devices, a keyboard 144, a guitar 140, a left channel for a CD 146 and a right channel for a CD 148, are connected to the four input channels of the transmitter device 110. In this example the keyboard and guitar use the same sample rate and sample format (say 48 kHz, 24 bit, PCM encoded). The CD channels have a different sample rate and sample format (say 44.1 kHz, 16 bit, PCM encoded).

Media Packet Stream

Figure 2:
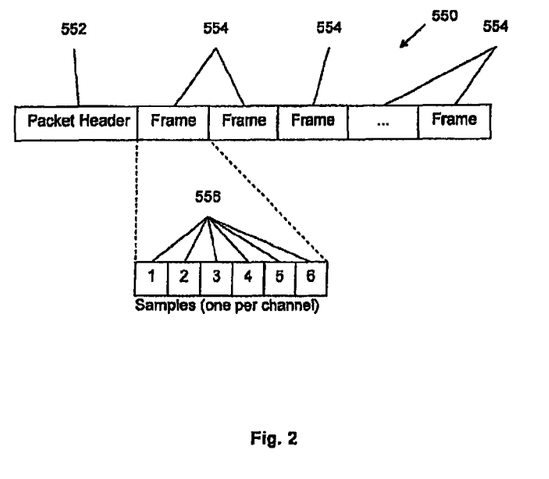
FIG. 2 is a schematic diagram of single packet of a media packet stream sent on the network using the invention.

Referring now to FIG. 2 which schematically shows a single media packet 550. Multiple media packets sent in sequence form a media packet stream. Each media packet 550 of the same media stream is comprised of the same media channel(s). Each media packet 550 is comprised of frames 554. Each media channel must be assigned a sample space 556 in each frame 554 of the media packet 550. This sample space is also called a slot. Each packet 550 has one slot per channel and thus one sample space 556 per frame 554.

Each frame 554 has associated with it an absolute time stamp that is also recorded within the packet. The concept of time is synchronized across all devices 110 and 112 across the network 100 so that they share a common clock. All devices 112 that control the playout of the media channels contained within a frame 554 must playout the channels of each frame in synchronization. This is done based on the timestamp of each frame 554. For example, each playout device may playout the samples 556 of each frame 554 at a predetermined delay past the absolute time stamp with reference to the common clock.

Redundant Media Packet Streams

Redundancy will now be described with reference to FIG. 4. Redundancy is achieved by duplicating packet streams over different interfaces of a network device. Redundancy is mainly controlled at the APEC layer. An APEC can program a given packet stream on the APE to be sent or received on a particular data interface. If a particular media packet stream is to be transmitted redundantly then the APEC programs two or more copies of the packet stream. One copy to be sent from the first interface 130 of the APE 120, and a second copy of the packet stream to be sent from the second interface 136 of the APE 120.

Similarly, the receiving APEC 126 programs its APE 124 to receive a copy on each data interface 132 and 134. Each duplicate packet stream is programmed to provide samples to the same output channels. This means the packet streams are written to the same buffer. Since the samples and their determined output times are identical for both packet streams, identical samples are processed and overwritten in the buffer for the output channel. Normally, this would result in errors and race conditions. However, since all redundant media packet streams contain identical samples having synchronized output times it does not matter which sample data of which media packet stream is written first to the buffer, as only one copy of each sample will actually be sent to the output channel since all duplicates are simply overwritten.

The output time dictates where in the buffer the sample is written to. The output time is for a sample is determined based on the timestamp associated with the sample in the media packet stream. This may include compensating for delays and offsets of each media packet stream. Note that timestamping every sample of a media channel does not require that a physical timestamp be added to every sample. If 20 samples of periodic audio data from a single media signal are sent in a packet, then simply timestamping the first sample also implies the timestamps for the rest. The remaining samples therefore have a timestamp by association.

Figure 3:
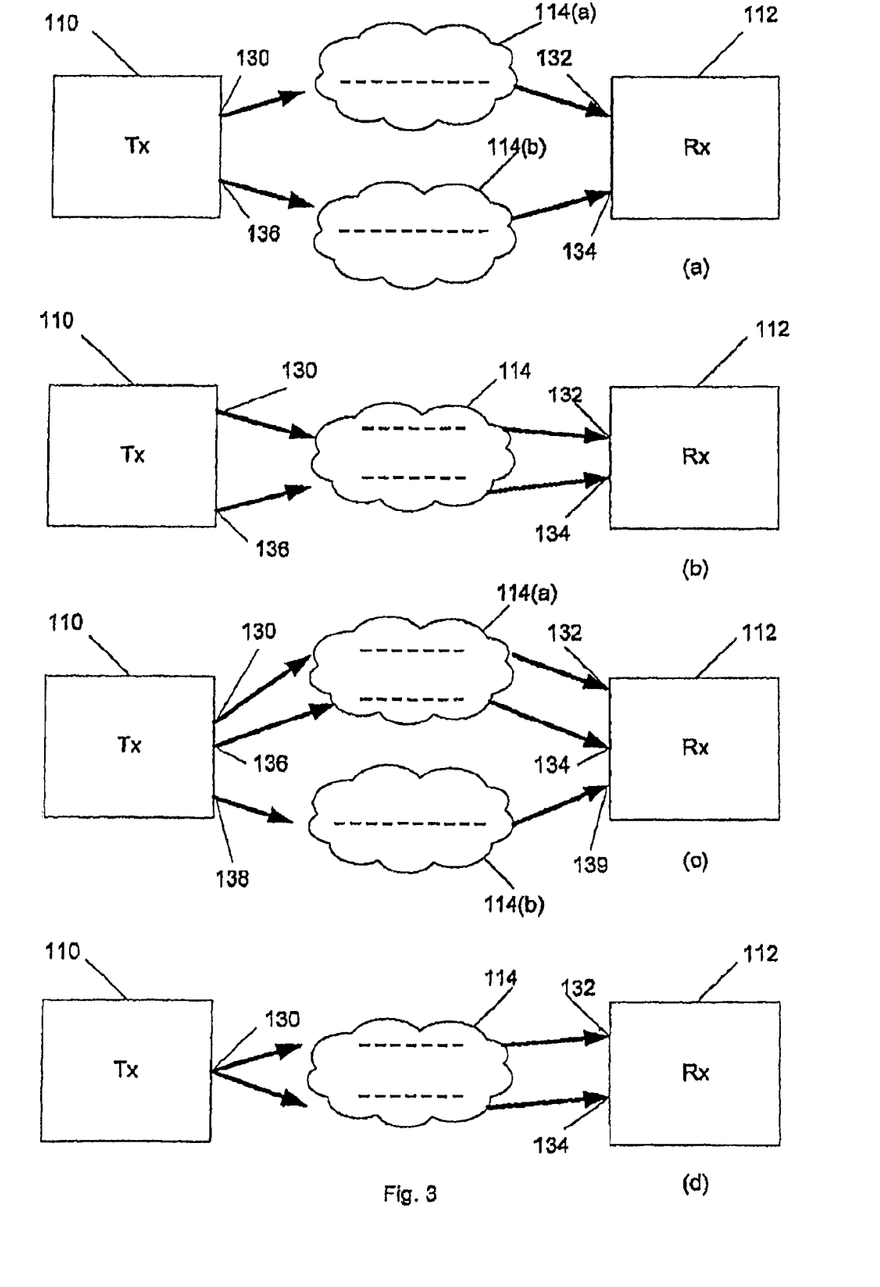

FIG. 3 shows some of the ways in which redundancy can be implemented on a data network. The interfaces can be connected to independent networks 114(a) and 114(b) or to a single network 114 via multiple paths. Interfaces 138 and 139 in FIG. 8(c) are the second redundant interfaces of the transmitter 110 and receiver 112 respectively. FIG. 8(d) shows that the one interface on the transmitter 110 can transmit to separate rate interfaces on the receiver 112.

APEs 120 and 124 with multiple channel data interfaces each designate one interface as primary. This is interface #0. Any further (redundant) channel data interfaces are numbered from 1. For example, the APE 124 of FIG. 4 with one primary 132 and one redundant 134 interface has interfaces #0 and #1.

When transmitting or receiving, for simplicity APEs 120 and 124 are configured to only send or receive to equivalent interfaces. The primary interface 130 on one APE 120 communicates with primary interface 132 on the other APE 124. Interface 136 #1 on one APE 120 communicates only with interface 134 #1 on the other APE 124. And so on. This allows each APE interface to be marked externally. For example, on the hardware itself, the primary interfaces might be coloured black, first redundant interfaces as red, secondly redundant interfaces as blue, and so on. This makes it easy for a user to distinguish between the differing interfaces and ensure they are wired correctly during set up.

Redundancy in the Unicast Protocol

A media channel is advertised on the network 114 to indicate that a receiver can subscribe to it using the unicast protocol. The receiver can request to receive the TXT record for a media channel that includes detailed information of the media channel, including the sample rate, bit depth and encoding (1=PCM). The "txtvers" field is a version number for the TXT record. The "nchan" field is the maximum number of channels per dynamic bundle. Stage-box 110 has a maximum of four channels per dynamic bundle, enough to send all inputs 144, 140, 146 and 148 in a single packet. The id field is an arbitrary physical channel identifier used by the APEC 120 to tersely identify its channels. The channel named "keyboard" happens to have ID 16. Outside the transmitting APEC 120, this ID is only useful to a receiver APEC 124 configuring a dynamic bundle on APEC 122.

The TXT record of the advertisement includes a field, marked say "nred. The value of "nred" indicates the number of redundant interfaces. If omitted, the value is treated as zero. A value of zero indicates no redundant interfaces meaning that the APE 120 of the transmitter 110 supports a primary data stream only. A value of 1 indicates a single redundant interface. Values greater than 1 indicate multiple redundant interfaces (numbered 1 . . . n).

Rather than send a single dynamic bundle request, the receiving APEC 126 may also send one request per interface available on the transmitter, each with a different interface field. Alternatively, the request for the redundant stream to the redundant interface may be incorporated into the original request message for the packet stream to the non-redundant interface.

Figure 4:
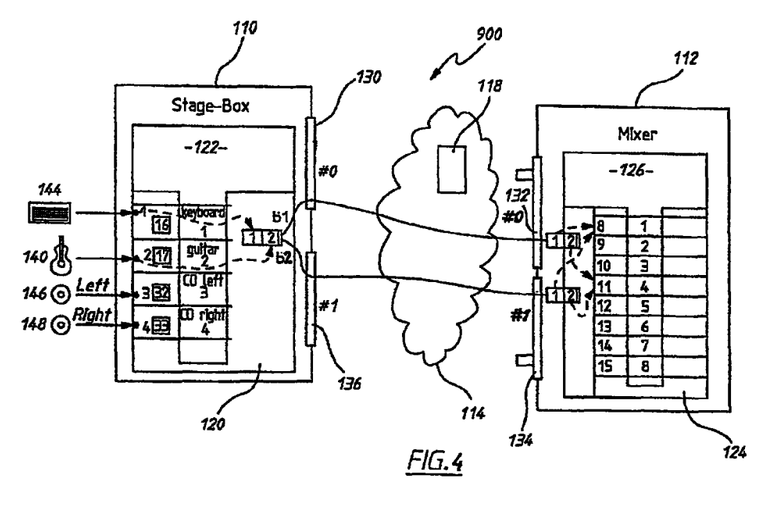
FIG. 4 is a schematic diagram of the network using redundant interfaces in accordance with an embodiment of the invention.

As shown in FIG. 4, stage-box 110 has a redundant interface 136 (#1) in addition to the primary interface 130 (#0). The TXT record of the channel advertisement is now formatted as follows:

Record: keyboard@stage-box._netaudio_chan._udp.local TXT
    txtvers=2
    rate=48000
    bits=24
    enc=1
    nchan=4
    id=16
    nred=1

Mixer 112 also supports a redundant channel. Its primary data interface 132 has address 169.254.28.12. Its secondary data interface 134 has address 169.254.132.15.

Locally, mixer 112 sends the following "create RX bundle" messages from its APEC 126 to its APE 124:

| Field | Value | Notes |
| --- | --- | --- |
| Destination address | 169.254.28.12 | Mixer's primary data interface address |
| Destination port | 26528 | |
| Interface | 0 | Primary data interface is #0 |
| Number of channels | 2 | |
| Map for slot 1 | [8] | Array with one element: RX channel 1 |
| Map for slot 2 | [11] | Array with one element: RX channel 4 |
| Destination address | 169.254.132.15 | Mixer's secondary data interface address |
| Destination port | 28452 | |
| Interface | 1 | Secondary data interface is #1 |
| Number of channels | 2 | |
| Map for slot 1 | [8] | Array with one element: RX channel 1 |
| Map for slot 2 | [11] | Array with one element: RX channel 4 |

Each message configures one received packet stream to one of the interfaces 132 or 134. The secondary interface 134 (#1) might use the same port number as the primary interface 132 or a different one, depending on the APE 124 design. This example assumes that a different port is chosen.

Just as mixer 112 must create two separate bundles on its APE 124, it must create two separate dynamic bundles on stage-box 110. The following messages are sent to APEC 122 from the APEC 126:

| Field | Value | Notes |
| --- | --- | --- |
| Destination address | 168.254.28.12 | Mixer's primary data interface address |
| Destination port | 26452 | |
| Interface | 1 | Primary data interface is #0 |
| Number of channels | 2 | |
| TX Channel for slot 1 | 16 | ID of keyboard@stage-box |
| TX Channel for slot 2 | 17 | ID of guitar@stage-box |

Finally, stage-box 110 creates two bundles on the local APE 120 to fulfill these requests. The following is sent from the APEC 122 to the APE 120:

| Field | Value | Notes |
| --- | --- | --- |
| Destination address | 169.254.28.12 | Mixer's primary data interface address |
| Destination port | 26528 | |
| Interface | 0 | Primary data interface (on stage-box) is #0 |
| Number of channels | 2 | |
| TX Channel for slot 1 | 16 | TX Channel 1 |
| TX Channel for slot 2 | 17 | TX Channel 2 |
| Destination address | 169.254.132.15 | Mixer's secondary data interface address |
| Destination port | 28452 | |
| Interface | 1 | Secondary data interface (on stage-box) is #1 |
| Number of channels | 2 | |
| Map for slot 1 | 16 | TX Channel 1 |
| Map for slot 2 | 17 | TX Channel 2 |

Multicast Redundancy

To support redundant multicast, the transmitter 110 creates several different 5 packet streams and advertises them as separate static bundles associated with a single bundle name.

For example, to advertise two copies of bundle b1 and b2, one primary 130 and one secondary 136, stage-box 110 would first claim a multicast address for each bundle. The primary bundle uses 239.254.46.46. The secondary bundle uses 10 239.254.98.147. For this example, assume both use the same port (29061).

Two service records (SRV) are created, one for each packet stream. Since each packet stream is identically formatted, only a single TXT record is required.

Record: b1@stage-box._netaudio_bund._udp.local SRV
0 1 29061 46.46.254.239.mcast.local
Record: b1@stage-box._netaudio_bund._udp.local SRV
1 1 29061 147.98.254.239.mcast.local
Record: b1@stage-box._netaudio_bund._udp.local TXT
    txtvers=1
    rate=48000
    bits=24
    enc=1
    nchan=4

If only a single (primary) interface is used, the "priority" field (which is represented as the first number) in the SRV is set 0. A non-zero priority indicates that the bundle applies to a redundant interface, in this case interface 1.

Decoding these bundle advertisements allows the receiver to configure appropriate bundles on each interface. The APEC 126 configures the APE 124 to receive the primary bundle on the first primary interface 132 and the second bundle on the secondary interface 134.

Buffer Management

Whether unicast or multicast protocol is used, the way that the receiver device 112 manages the duplicated packet streams is the same.

Figure 5:
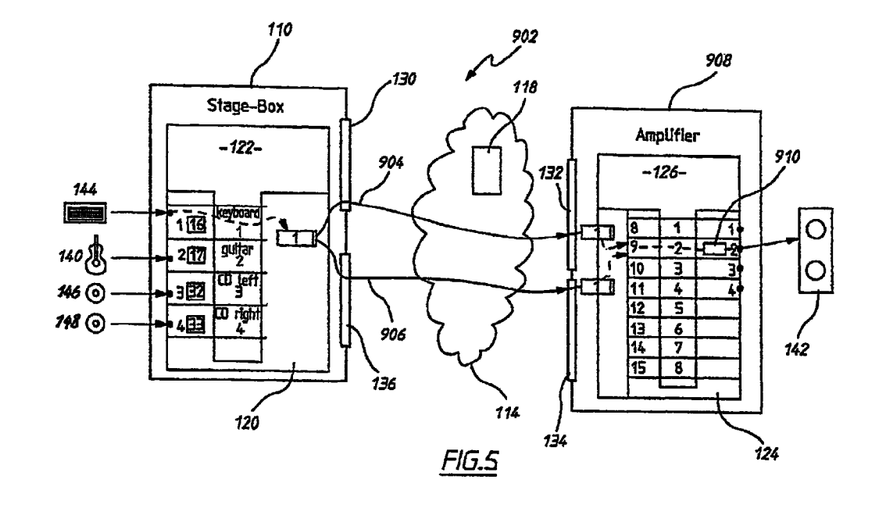
FIG. 5 is a further schematic diagram of a network using redundant interfaces in according with a further embodiment of the invention.

Referring to the data network 902 of FIG. 5, this shows that the transmitter device 110 transmits two identical packet streams. One packet stream 904 is sent from the primary data interface 130 and the second packet stream 906 is sent from the first redundant interface 136. Both contain samples generated by the media channel connected to the keyboard 144.

The first primary packet stream 904 is received by the receiver device, the amplifier 908, at the primary data interface 132. The second redundant packet stream 906 is received by the amplifier 908 at the first redundant data interface 134. Each packet stream 904 and 906 is processed by the APE 124 in accordance with the instructions received from the APEC 126.

Here, the APE 124 will process the received packet streams 904 and 906 for playout by the speaker 142 which is connected to the output channel 2 of the amplifier 908. Alternatively, the device connected to the output channel 2 may not be a playout device, such as a mixer or amplifier.

The APE 124 extracts samples from the received data streams 904 and 906 and determines the output time of each sample based on the respective timestamp. The APE 124 then writes the samples to a buffer 910 based on the determined output time before transmitting the samples to the output channel 2 for play out by the speaker 142.

Figure 6:
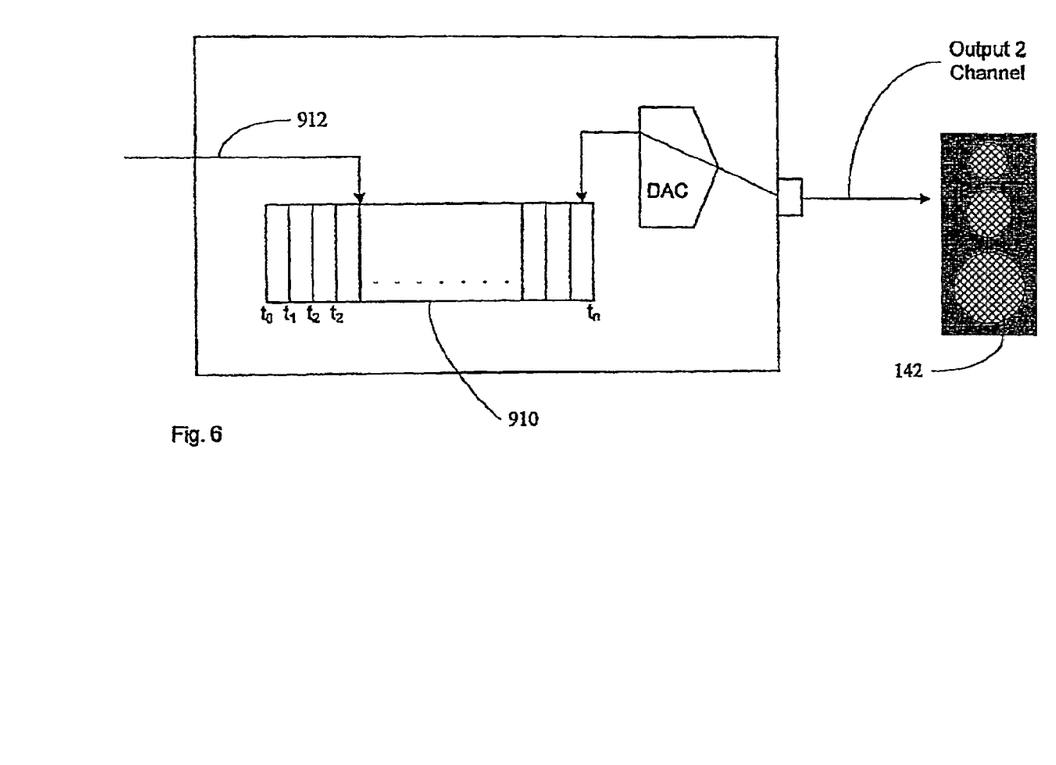
FIG. 6 is a schematic diagram of a buffer of an output channel of the receiver device.

The method of writing the samples to the buffer will now be described with reference to FIG. 6. Both packet streams 904 and 906 are processed independently and the APE 124 requires no specific knowledge that they are essentially exactly the same.

The samples of the keyboard media channel are extracted from the packet stream by the APE 124 and written 912 to the buffer 910 so that they are in sequential order for output in the buffer. The buffer is conceptually divided into intervals $t_0, t_2, t_3 \ldots t_n$ which are each of sample length and each correspond to one output time. One sample is written to each interval based on the respective output time. Once a sample is written to the last interval $t_o$ of the buffer 910 samples continue to be written to the first interval to over a previous sample that was written there but has since been passed to the output channel 2 and played out by the speaker 142.

Since each sample that is received has an associated timestamp with an absolute time reference the output time that corresponds to the absolute time reference can be easily determined. In this example, identical samples must be passed to the output channel in synchronisation, as a result the output time for each sample must also be the same. So, if a sample is received out of order it is possible to write it to the correct interval since the correct interval can be selected based on the output time of that sample. If a sample belongs to a time interval that has already been played out that sample will simply be discarded.

Both the first 904 and second 906 packet stream is processed in this manner. Since the samples and their determined output times are identical the same sample is written twice to the same interval. It does not matter whether the samples from the first 904 or second 906 packet stream are written to the buffer 910 first, the end result of the samples temporarily stored in the buffer will be the same.

In this way, if a packet from the first packet stream 904 is lost in transmission from the transmitter device 110, the samples from the identical packet in the second packet stream 906 is written to the buffer 910. In this case, these samples are only written once to the buffer. Of course, the reverse is possible where a packet is lost from the second packet stream 906 and instead only samples from the identical packet from the first packet stream 904 are written to the buffer 910.

Since the APEC 126 knows that packet streams 904 and 906 (more specifically, a particular slot in each packet stream 904 and 906) contain identical data and in the message sent from the APEC 126 to the APE 124 described above, it programs the APE 124 to unconditionally copy both into the same buffer, the APE 124 does not need to decide which packet stream is "current" or "live". The APE 124 processes and copies both on the same interval (location) in the buffer without consideration of which media stream 904 and 906 is processed and written first to the buffer, both streams are simply processed in the usual way. This reduces the complexity in managing systems that are able to transmit and receive redundant packet streams. For example decision making on whether to activate a fail over switch is no longer necessary.

Once paths are set up, no further decision logic is required by APE 124 or APEC 126 unless both paths fail.

If samples are corrupted during transmission on the network then those samples, once identified, should be discarded. The duplicate media packet stream will ensure that the output buffer receives at least one copy of the sample without any need to switch between the media packet streams. Any transport-level error checking or error recovery is performed before the sample data is written to the shared buffer.

The actual sample content of each packet in the media packet streams 904 and 906 need not be identical. For example, the media channel could be packetized differently into the packet streams 904 and 906 so that packets from each stream do not contain the same samples. The method of writing the samples to the buffer will still be the same as each identical sample, no matter the position of its associated frame in the packet, will share a common output time. When writing the samples to the buffer the APE 124 will refer to the output time of each to determine which interval (location) the sample should be written to.

The invention can also allow for further redundant streams each containing the same media channels. Each media packet stream would be sent to a different data interface. Again the APE 124 would process all the packet streams independently and extracted samples are written to the same buffer for that output channel.

Of course, the samples 556 could be a mixture of one or more media sources, such as a keyboard 144 and a guitar 140. Alternatively, a mixer could be provided to mix samples prior to being written to the buffer.

It will be appreciated by persons skilled in the art that numerous variations and/or modifications may be made to the invention as shown in the specific embodiments without departing from the spirit or scope of the invention as broadly described.

When using static bundles, channels can be assigned to bundles in any convenient manner. It is also possible to implement redundancy by creating specific bundles on specific interfaces.

Dynamic bundles are usually unicast. Static bundles are usually multicast. If required, it is possible to configure dynamic bundles as multicast or static bundles as unicast.

Physical channel inputs/outputs could also be implemented in software, such as in the software of the mixer, they don't have to be real physical plugs.

While these examples assume sampled audio data, the exact same protocol mechanisms will work for any fixed-size periodic data stream. Non-periodic or variable sized data can also be supported with variations to the transport (packet & bundling) mechanisms.

Assigning homogeneous channels to slots is an implementation convenience. Non-homogenous channel media data with a common sample rate can be identified in a frame using a start byte and length.

MIDI is an example of non-periodic data. The same interface that allows a user to abstractly route audio to audio and video to video can route MIDI to MIDI. Like periodic packets, MIDI packets would have a timestamp, but there would not be the expectation of receivers that units of MIDI data would arrive periodically. Non-periodic data might need a periodic 'keepalive' message to distinguish between a quiet and a non-functional stream. Non-periodic data can be automatically aggregated as easily as periodic data as long as there is a flag to say "none of this data in this packet".

The present embodiments are, therefore, to be considered in all respects as illustrative and not restrictive.

Claims defining the invention are as follows:

1. A device for receiving media packet streams from a data network comprising:
    a processing system configured to extract samples from a first media packet stream and a second media packet stream; and
    a buffer,
    wherein the processing system is configured to store the extracted samples in the buffer based on an output time of each sample, such that extracted samples from the first media packet stream having the same output time as extracted samples from the second media packet stream are written to the same location in the buffer without any knowledge as to whether the sample from the first media packet stream and the sample from the second media packet stream is actually redundant to one another.

2. A device according to claim 1, wherein the buffer stores a predetermined maximum number of extracted samples.

3. A device according to claim 1, wherein the buffer stores the extracted samples in sequential order according to their respective output time.

4. A device according to claim 1, wherein the output time is the playout time.

5. A device according to claim 1, wherein the location is the storage space allocated to store one sample.

6. A device according to claim 1, wherein a first extracted sample written to the location is written over a second extracted sample from a different packet stream previously written to the location.

7. A device according to claim 1, wherein the buffer is associated with one output channel and each media packet stream is directed to the same output channel.

8. A device according to claim 1, wherein the processing system detects samples that are corrupted and prevents corrupted samples from being written to the buffer.

9. A device according to claim 1, wherein all the samples contained in one media packet of the first media packet stream are not all contained in any single media packet of the second media packet stream.

10. A device according to claim 1, wherein the first and second media packet streams are received from different data interfaces of a transmitter device connected to the data network.

11. A device according to claim 1, wherein the samples of the media channel each have an associated timestamp and the processing system determines the output time for the extracted samples based on the respective timestamps.

12. A non-transitory processor-readable medium having processor readable instructions thereon configured to cause a processor to execute the steps of:
    extracting samples from a first media packet stream and a second media packet stream;
    storing each extracted sample in a buffer based on an output time of each extracted sample, such that extracted samples from the first media packet stream having the same output time as extracted samples from the second media packet stream are written to the same location in the buffer without any knowledge as to whether the sample from the first media packet stream and the sample from the second media packet stream is actually redundant to one another; and
    outputting a media signal from the buffer to a media device.

13. A processor-readable medium according to claim 12, wherein storing each extracted sample in the buffer comprises writing the extracted samples in sequential order according to the respective output time of each extracted sample.

14. A processor-readable medium according to claim 12, wherein the output time is a playout time.

15. A processor-readable medium according to claim 12, wherein the location is the storage space allocated to store one sample.

16. A processor-readable medium according to claim 12, wherein storing each extracted sample in the buffer comprises writing a first extracted sample to a memory location and then writing a second extracted sample from a different packet stream over the first extracted sample at the memory location.

17. A processor-readable medium according to claim 12, wherein the buffer is associated with one output channel and each media packet stream is directed to the same output channel.

18. A processor-readable medium according to claim 12 further comprising detecting samples that are corrupted and causing these corrupted samples not to be written to the buffer.

19. A processor-readable medium according to claim 12, wherein all the samples contained in one media packet of the first media packet stream are not all contained in any single media packet of the second media packet stream.

20. A processor-readable medium according to claim 12, wherein the samples of the media channel each have an associated timestamp and the output time for the extracted samples is based on the respective timestamps.

21. A processor-readable medium according to claim 12 further comprising sending one message to request that the first and second media packet streams be received.

22. A system for communicating redundant media packet streams over a network comprising:
    a first processing system configured to receive a media signal from a media device, generate a first and second media packet stream from the media signal, and transmit the first and second media packet streams via a network; and
    a second processing system configured to receive the first and second media packet streams via the network, extract samples from the first and second media packet streams, and store the extracted samples in a buffer based on an output time of each sample, such that extracted samples from the first media packet stream having the same output time as extracted samples from the second media packet stream are written to the same location in the buffer without any knowledge as to whether the sample from the first media packet stream and the sample from the second media packet stream is actually redundant to one another.

* * * * *